United States Patent Office 3,788,867
Patented Jan. 29, 1974

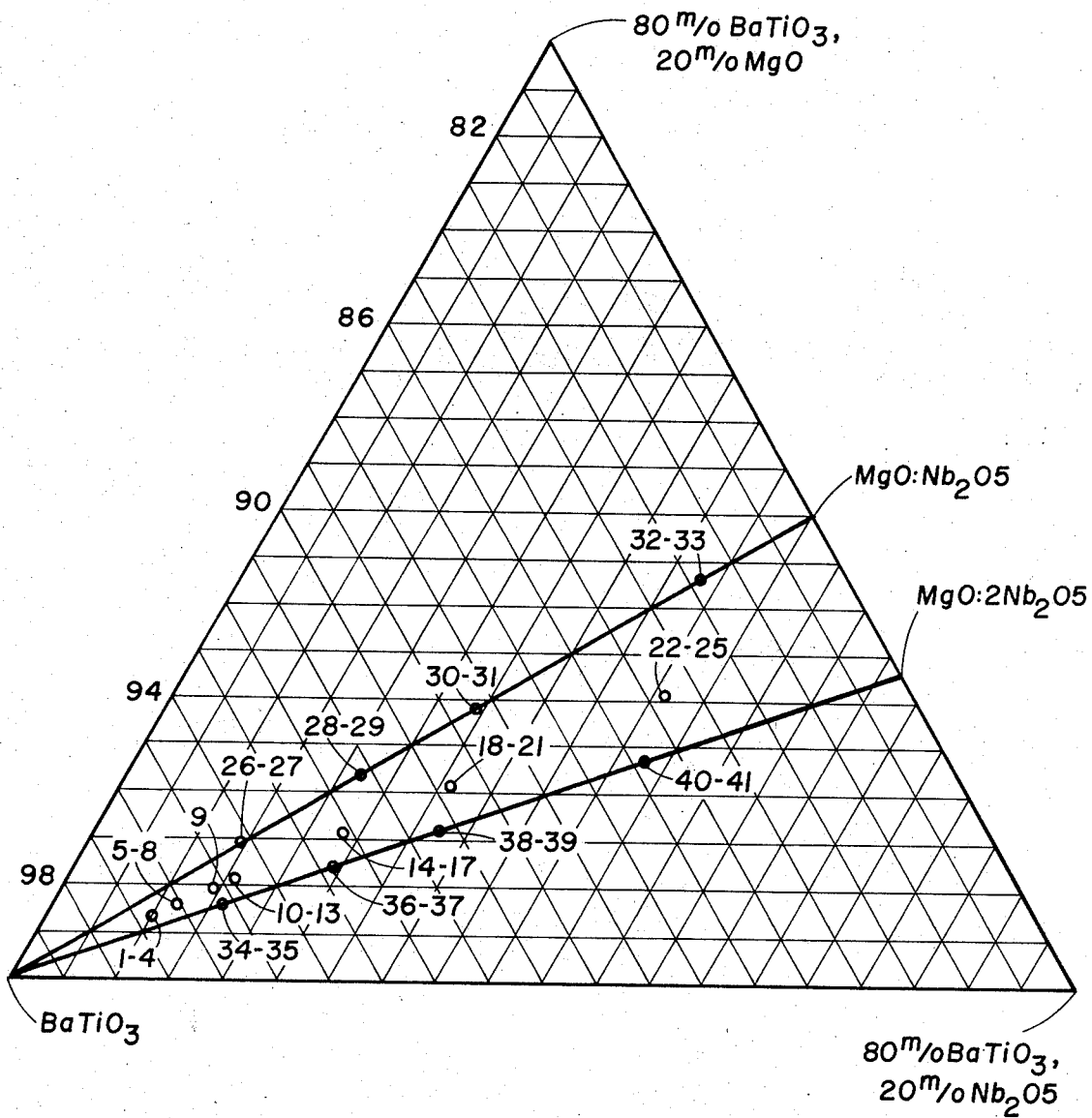

3,788,867
$BaTiO_3$-MgO-$Nb_2O_5$ DIELECTRIC CERAMIC COMPOSITIONS AND METHOD
Truman C. Rutt, Niagara Falls, N.Y., assignor to
N. L. Industries, Inc., New York, N.Y.
Filed Nov. 1, 1971, Ser. No. 194,457
Int. Cl. C04b 33/26, 35/46
U.S. Cl. 106—73.31                    8 Claims

ABSTRACT OF THE DISCLOSURE

Bismuth-free, dielectric ceramic compositions consisting essentially of from approximately 97 mol percent to approximately 82 mol percent $BaTiO_3$, the balance being MgO and $Nb_2O_5$ in a mol ratio of from about 1:1 to 1:2, may be fired at temperatures in the range from about 1300° C. to 1400° C. to produce useful dielectric ceramic bodies including monolithic capacitors. The resultant bodies have relatively low temperature coefficients, low dissipation factors, and vary in relative permittivity from about 300 to about 2000. The permittivity may be controlled by adjusting the mol percentage of MgO and $Nb_2O_5$ in the composition.

BACKGROUND OF THE INVENTION

This invention relates to dielectric compositions and is particularly concerned with dielectric ceramic compositions principally composed of barium metatitanate, with dielectric ceramic bodies formed therefrom, and with processes for the production of such compositions and bodies.

In the electronic industry there is a large demand for ceramic capacitors, because, in general, their cost is low and they have both good volumetric efficiency and high temperature usefulness, as well as inherent reliability. Most such ceramic capacitors are principally composed of barium metatitanate with relatively small amounts of other oxides, and compositions for capacitors can be obtained with very high permittivities. It has been found, however, that the dependence of permittivity on temperature is quite high in most such compositions. Although dielectric ceramic compositions and bodies principally composed of barium metatitanate and containing bismuth oxide as an additive or modifier have been found to have only relatively small variations in permittivity with temperature variations over a rather wide working temperature range, i.e. a low temperature coefficient, such compositions are usually undesirable for making monolithic capacitors since the bismuth reacts with palladium at elevated temperatures. This substantially precludes the use of the latter as internal electrodes in such capacitors and necessitates the use of more expensive noble metals as electroding materials in forming such capacitors. Hence, there has developed a need for dielectric ceramic compositions with reasonably high permittivities and low temperature coefficients which do not contain bismuth compounds.

SUMMARY OF THE INVENTION

It has been found that bismuth-free, dielectric ceramic compositions which consist essentially of from approximately 97 mol percent to approximately 82 mol percent barium metatitanate ($BaTiO_3$), the balance being magnesium oxide (MgO) and niobium oxide ($Nb_2O_5$) in a mol ratio of from about 1:1 to about 1:2, may be fired within a relatively wide range of temperatures to give dielectric ceramic bodies which have relatively low temperature coefficients and low dissipation factors, and which can be made to have permittivities within a considerable range.

More particularly, the present invention provides a process for producing dielectric ceramic bodies characterized by having, at 25° C. and 1 kHz, a dissipation factor (tan δ) of less than .015 and a relative permittivity of from about 300 to about 2000, with a variation from the permittivity at 25° C. of no more than about ±16% through the temperature range from −40° C. to 145° C. The process consists essentially in forming a mixture of $BaTiO_3$, MgO, and $Nb_2O_5$, all in finely divided form, the mol ratio of the MgO and $Nb_2O_5$ present being from about 1:1 to about 1:2, and the $BaTiO_3$ constituting from approximately 97 mol percent to approximately 82 mol percent of the mixture, forming bodies from said mixture, and firing said bodies in the temperature range from about 1300° C. to about 1400° C. In such dielectric bodies the permittivities vary with the mol percentages of the MgO and $Nb_2O_5$ present in the mixture.

SHORT DESCRIPTION OF THE DRAWING

The drawing is a ternary diagram of a portion of the system $BaTiO_3$-MgO-$Nb_2O_5$ showing an area within which compositions are within the scope of this invention and denoting a number of such compositions.

DESCRIPTION OF THE INVENTION

Hereinafter in this specification and the appended claims, percentages and ratios are molar unless otherwise indicated and permittivity figures represent the permittivity relative to vacuum.

In the immediately following paragraph there is described a procedure by which bodies of a dielectric ceramic composition according to the invention may be produced.

$BaTiO_3$, MgO, and $Nb_2O_5$, in powdered form, were blended together in the desired proportions. The ingredients were all finely divided, about 1 to 1.5μ in size, and a small amount of alcohol was used to moisten the mixture during blending. After drying the blended mixture, about 5 wt. percent of a 5 wt. percent aqueous solution of polyvinyl alcohol was added and blended in to serve as a temporary binder. Ceramic test discs were formed from the mixture by pressing at about 700 kg./cm.². The resultant discs, approximately 1.27 cm. in diameter and 1 mm. thick, were fired, in air, at a temperature in the range from about 1300° C. to about 1400° C. for two hours and were thereafter electroded to form test capacitors by coating the opposed faces with a commercial electroding composition and refiring in air at about 815° C. for one hour.

The following table sets forth, as examples, a number of compositions within the scope of the invention and the firing temperature employed in forming the test discs for each example. The listed compositions are indicated on the ternary diagram of the drawing.

TABLE A

| | Composition in percent | | | Firing temperature, ° C. |
|---|---|---|---|---|
| | $BaTiO_3$ | (MgO, $Nb_2O_5$) | MgO: $Nb_2O_5$ | |
| Example: | | | | |
| 1 | 96.7 | 3.3 | 2:3 | 1,305 |
| 2 | 96.7 | 3.3 | 2:3 | 1,325 |
| 3 | 96.7 | 3.3 | 2:3 | 1,340 |
| 4 | 96.7 | 3.3 | 2:3 | 1,370 |
| 5 | 96.1 | 3.9 | 2:3 | 1,305 |
| 6 | 96.1 | 3.9 | 2:3 | 1,325 |
| 7 | 96.1 | 3.9 | 2:3 | 1,340 |
| 8 | 96.1 | 3.9 | 2:3 | 1,370 |
| 9 | 95.2 | 4.8 | 2:3 | 1,400 |
| 10 | 94.8 | 5.2 | 2:3 | 1,305 |
| 11 | 94.8 | 5.2 | 2:3 | 1,325 |
| 12 | 94.8 | 5.2 | 2:3 | 1,340 |
| 13 | 94.8 | 5.2 | 2:3 | 1,370 |
| 14 | 92.2 | 7.8 | 2:3 | 1,305 |
| 15 | 92.2 | 7.8 | 2:3 | 1,325 |

TABLE A—Continued

| | Composition in percent | | MgO: Nb₂O₅ | Firing temperature °C. |
|---|---|---|---|---|
| | BaTiO₃ | (MgO, Nb₂O₅) | | |
| Example: | | | | |
| 16 | 92.2 | 7.8 | 2:3 | 1,340 |
| 17 | 92.2 | 7.8 | 2:3 | 1,370 |
| 18 | 89.7 | 10.3 | 2:3 | 1,305 |
| 19 | 89.7 | 10.3 | 2:3 | 1,325 |
| 20 | 89.7 | 10.3 | 2:3 | 1,340 |
| 21 | 89.7 | 10.3 | 2:3 | 1,370 |
| 22 | 84.7 | 15.3 | 2:3 | 1,305 |
| 23 | 84.7 | 15.3 | 2:3 | 1,325 |
| 24 | 84.7 | 15.3 | 2:3 | 1,340 |
| 25 | 84.7 | 15.3 | 2:3 | 1,370 |
| 26 | 94.1 | 5.9 | 1:1 | 1,325 |
| 27 | 94.1 | 5.9 | 1:1 | 1,370 |
| 28 | 91.2 | 8.8 | 1:1 | 1,325 |
| 29 | 91.2 | 8.8 | 1:1 | 1,370 |
| 30 | 88.3 | 11.7 | 1:1 | 1,325 |
| 31 | 88.3 | 11.7 | 1:1 | 1,370 |
| 32 | 82.8 | 17.2 | 1:1 | 1,325 |
| 33 | 82.8 | 17.2 | 1:1 | 1,370 |
| 34 | 95.2 | 4.8 | 1:2 | 1,325 |
| 35 | 95.2 | 4.8 | 1:2 | 1,370 |
| 36 | 92.8 | 7.2 | 1:2 | 1,325 |
| 37 | 92.8 | 7.2 | 1:2 | 1,370 |
| 38 | 90.4 | 9.6 | 1:2 | 1,325 |
| 39 | 90.4 | 9.6 | 1:2 | 1,370 |
| 40 | 85.7 | 14.3 | 1:2 | 1,325 |
| 41 | 85.7 | 14.3 | 1:2 | 1,370 |

Test discs prepared substantially in accordance with the procedure set forth above and employing the compositions and firing temperatures specified in the examples in Table A were tested at 1 kHz. to determine their relative permittivities ($\epsilon$) and dissipation factors (tan $\delta$) at temperatures in the range from −40° C. to 145° C. In the following table the relative permittivity at 25° C., the maximum plus and minus variations therefrom within the specified temperature range, and the dissipation factor at 25° C. are given for each said example. In most instances the figures in the table are averages of the readings from a plurality of discs.

TABLE B

| | Permittivity | | | Dissipation factor, tan $\delta$ |
|---|---|---|---|---|
| | 25° C. | Max. + and − variation, percent | | |
| | | (−) | (+) | |
| Example: | | | | |
| 1 | 1,848 | 14.8 | 14.2 | .0094 |
| 2 | 1,923 | 13.8 | 12.7 | .0086 |
| 3 | 1,982 | 12.5 | 11.6 | .0085 |
| 4 | 1,979 | 11.6 | 9.9 | .0079 |
| 5 | 1,721 | 14.4 | 14.1 | .0086 |
| 6 | 1,798 | 13.3 | 12.6 | .0084 |
| 7 | 1,827 | 12.2 | 9.9 | .0080 |
| 8 | 1,835 | 11.3 | 8.1 | .0082 |
| 9 | 1,587 | 10.5 | 6.2 | .0087 |
| 10 | 1,673 | 13.7 | 16.3 | .0121 |
| 11 | 1,528 | 12.0 | 15.5 | .0101 |
| 12 | 1,541 | 10.9 | 13.2 | .0105 |
| 13 | 1,547 | 9.9 | 11.1 | .0095 |
| 14 | 1,366 | 13.1 | 16.7 | .0096 |
| 15 | 1,338 | 11.0 | 13.1 | .0094 |
| 16 | 1,214 | 9.9 | 10.7 | .0096 |
| 17 | 1,178 | 8.9 | 9.2 | .0095 |
| 18 | 899 | 7.4 | 8.8 | .0077 |
| 19 | 845 | 5.7 | 6.8 | .0087 |
| 20 | 775 | 4.7 | 3.8 | .0086 |
| 21 | 723 | 3.7 | 1.4 | .0087 |
| 22 | 458 | 2.1 | 3.5 | .0056 |
| 23 | 453 | 1.2 | 6.8 | .0052 |
| 24 | 476 | 1.5 | 9.7 | .0118 |
| 25 | 431 | 3.1 | 9.9 | .0048 |
| 26 | 1,499 | 11.8 | 13.0 | .0079 |
| 27 | 1,440 | 11.1 | 12.1 | .0090 |
| 28 | 1,022 | 9.5 | 11.6 | .0085 |
| 29 | 1,026 | 8.6 | 9.2 | .0090 |
| 30 | 640 | 5.2 | 4.9 | .0074 |
| 31 | 615 | 3.8 | 4.4 | .0080 |
| 32 | 296 | 3.6 | 8.6 | .0049 |
| 33 | 292 | 5.7 | 12.7 | .0049 |
| 34 | 1,559 | 8.2 | 9.5 | .0090 |
| 35 | 1,434 | 1.4 | 13.7 | .0079 |
| 36 | 1,285 | 11.1 | 12.7 | .0089 |
| 37 | 1,182 | 4.7 | 3.8 | .0089 |
| 38 | 904 | 6.1 | 5.4 | .0090 |
| 39 | 809 | 0.9 | 8.5 | .0082 |
| 40 | 485 | 2.2 | 4.9 | .0053 |
| 41 | 507 | 3.1 | 10.7 | .0047 |

As indicated above, the dielectric ceramic compositions of the present invention are particularly useful, because of the relatively low temperature dependence, low dissipation factor, and the ease with which the permittivity of bodies made therefrom can be controlled, in forming monolithic capacitors. They are, as shown below, useful in the production of such capacitors even when palladium is used for the internal electrodes. The following example describes such use.

EXAMPLE 42

Sheets approximately 0.05 mm. thick were cast from a mixture of the composition of Example 10 with an ethyl cellulose base vehicle. On portions of the sheets there was deposited, by screen-printing, a thin film of a commercial palladium electroding paste. By pressing at about 85° C. and 280 kg./cm.² there was formed a composite body comprising eleven layers of the cast composition, all but the top layer having the printed film thereon, and with the films on alternate layers extending to opposite faces of the body. The body was heated to burn out carbonaceous material and was then fired at 1370° C. for two hours. After cooling, electrode connectors were applied in conventional manner to the ends of the fired body to bond the exposed internal electrodes.

The resultant monolithic capacitor, which was about 7 mm. square, had essentially the same dielectric properties as the test discs made from the composition of Example 10. The capacitance of the unit was 29 nanofarads.

In preparing the compositions of the present invention it is desirable, as pointed out above, to have the BaTiO₃ and the oxides of magnesium and niobium in very fine form. So far as the BaTiO₃ is concerned, it is preferred to use one having an average particle size of from 1$\mu$ to 1.5$\mu$ and a fine crystallite size, since the use of BaTiO₃ having a large crystallite size tends to increase the variation of permittivity with temperature between about 100° C. and 130° C. in bodies made therefrom. The niobium and magnesium oxides preferably have an average particle size of 1$\mu$ or less and it is preferred to have no particles present in the powdered mixture larger than about 2$\mu$. The oxides may be relatively pure commercial grades since very small amounts of impurities will not appreciably affect the results.

It will be noted from the data set out above that within the relatively wide firing temperature range from about 1300° C. to about 1400° C. (2375° F. to 2550° F.) the dielectric characteristics of bodies produced from a particular composition are quite similar and in most cases relatively close. This is a great practical advantage since many dielectric ceramic compositions are quite sensitive to variations in firing temperature and consequently, very precise firing control is required.

It will also be noted that, within the scope of the invention, variation only of amounts of MgO and Nb₂O₅ used as additives permits the obtaining of dielectric ceramic bodies with permittivities ranging from approximately 300 to approximately 2000 from the same ingredients. This makes easier the production of dielectric ceramic bodies having a wide permittivity range but retaining a low temperature coefficient and a low dissipation factor. In fact the present invention makes it possible to easily produce a product line of capacitors which are of identical size but widely varying capacitance, thus facilitating their application to circuit boards and the like.

What is claimed is:

1. A process for producing dielectric ceramic bodies characterized by having, at 25° C. and 1 kHz., a dissipation factor (tan $\delta$) of less than .015, and a permittivity of from about 300 to about 2000, with a variation from the permittivity at 25° C. of no more than about ±16% through the temperature range from −40° C. to 145° C., which comprises forming a mixture of BaTiO₃ MgO, and Nb₂O₅, all in finely divided form, the molar ratio of MgO to $Nb_2O_5$ being within the approximate range from 1:1 to 1:2, and the $BaTiO_3$ constituting from approximately 97% to approximately 82%; forming bodies from said mixture; and firing said bodies in the temperature range from about 1300° C. to about 1400° C.; the permittivity being controlled by varying the total of the percentages of MgO and $Nb_2O_5$ from about 3 to about 18.

2. A process as set forth in claim 1 in which the particle size of the materials in said mixture is not larger than about $2\mu$.

3. A dielectric ceramic composition consisting essentially of from about 82% to about 97% $BaTiO_3$, the remainder being MgO and $Nb_2O_5$ in a molar ratio from approximately 1:1 to approximately 1:2.

4. A dielectric ceramic composition as set forth in claim 3 wherein the particle size of the ingredients is not larger than about $2\mu$.

5. A dielectric ceramic composition as set forth in claim 3 wherein the $MgO:Nb_2O_5$ ratio is approximately 1:1.

6. A dielectric ceramic composition as set forth in claim 3 wherein the $MgO:Nb_2O_5$ ratio is approximately 2:3.

7. A dielectric ceramic composition as set forth in claim 3 wherein the $MgO:Nb_2O_5$ ratio is approximately 1:2.

8. A body of the composition as set forth in claim 3 having, when fired in air at a temperature of from about 1300° C. to about 1400° C., a permittivity, at 1 kHz. and 25° C., in the range from about 300 to about 2000 and a variation from the permittivity at 25° C. of no more than about ±16% through the temperature range from −40° C. to 145° C.

References Cited

UNITED STATES PATENTS

| | | | |
|---|---|---|---|
| 2,801,181 | 7/1957 | Das Gupta | 106—39 |
| 3,243,315 | 3/1966 | Markarian et al. | 317—258 UX |
| 3,235,939 | 2/1966 | Rodriguez et al. | 317—258 UX |
| 3,237,066 | 2/1966 | Martin et al. | 317—258 |

FOREIGN PATENTS

| | | | |
|---|---|---|---|
| 693,455 | 1953 | Great Britain | 317—258 |

HELEN M. McCARTHY, Primary Examiner

U.S. Cl. X.R.

317—258

UNITED STATES PATENT OFFICE
CERTIFICATE OF CORRECTION

Patent No. 3,788,867            Dated January 29, 1974

Inventor(s)     Truman C. Rutt

It is certified that error appears in the above-identified patent and that said Letters Patent are hereby corrected as shown below:

Column 1, line 58, "now" has been changed to -- low --.

Signed and sealed this 19th day of November 1974.

(SEAL)
Attest:

McCOY M. GIBSON JR.
Attesting Officer

C. MARSHALL DANN
Commissioner of Patents